United States Patent
Kitagawa

(10) Patent No.: US 10,580,161 B2
(45) Date of Patent: Mar. 3, 2020

(54) IMAGING SYSTEM, OBJECT DETECTION DEVICE AND METHOD OF OPERATING SAME

(71) Applicant: FUJIFILM Corporation, Tokyo (JP)

(72) Inventor: Junya Kitagawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 135 days.

(21) Appl. No.: 15/954,067

(22) Filed: Apr. 16, 2018

(65) Prior Publication Data

US 2018/0240251 A1   Aug. 23, 2018

Related U.S. Application Data

(63) Continuation of application No. PCT/JP2016/080368, filed on Oct. 13, 2016.

(30) Foreign Application Priority Data

Oct. 27, 2015  (JP) ................................. 2015-210534

(51) Int. Cl.
*H04N 5/235* (2006.01)
*H04N 5/247* (2006.01)
(Continued)

(52) U.S. Cl.
CPC ............ *G06T 7/73* (2017.01); *G06K 9/00697* (2013.01); *H04N 5/2351* (2013.01);
(Continued)

(58) Field of Classification Search
CPC ............. G06T 7/73; G06T 2207/30196; G06T 2207/10048; H04N 5/247; H04N 5/2353;
(Continued)

(56) References Cited

U.S. PATENT DOCUMENTS

2014/0233796 A1*  8/2014  Tanaka ................... G06T 7/194
382/103

FOREIGN PATENT DOCUMENTS

JP       2850890 B2    1/1999
JP     2002-32754 A    1/2002
(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2016/080368, dated May 11, 2018, with English translation.
(Continued)

*Primary Examiner* — Jared Walker
(74) *Attorney, Agent, or Firm* — Birch, Stewart, Kolasch & Birch, LLP

(57) ABSTRACT

First object candidate region extraction means extracts a first object candidate region where an object is expected to be present from an infrared light image captured by an infrared light imaging device. Second object candidate region extraction means extracts a second object candidate region where the object is expected to be present from a visible light image captured by a visible light imaging device. Score integration means calculates an integration evaluation value by performing a weighted addition of a first evaluation value in the first object candidate region and a second evaluation value in the second object candidate region. Weight decision means decides a weight in the weighted addition on the basis of, for example, an environment temperature. Object region determination means determines an object region on the basis of the integration evaluation value.

20 Claims, 11 Drawing Sheets

(51) Int. Cl.
*G06T 7/73* (2017.01)
*G06K 9/00* (2006.01)

(52) U.S. Cl.
CPC .......... *H04N 5/2353* (2013.01); *H04N 5/247* (2013.01); *G06T 2207/10048* (2013.01); *G06T 2207/30196* (2013.01)

(58) Field of Classification Search
CPC .......... H04N 5/2351; H04N 5/33; H04N 7/18; H04N 5/332; H04N 5/243; G06K 9/00697; G06K 9/6256; G06K 9/00228; G06K 9/00664; G06K 9/00771
See application file for complete search history.

(56) References Cited

FOREIGN PATENT DOCUMENTS

| | | |
|---|---|---|
| JP | 2004-163257 A | 6/2004 |
| JP | 2005-223605 A | 8/2005 |
| JP | 2011-86163 A | 4/2011 |
| JP | 2013-247492 A | 12/2013 |
| JP | 2014-157452 A | 8/2014 |

OTHER PUBLICATIONS

International Search Report (Form PCT/ISA/210) for International Application No. PCT/JP2016/080368, dated Dec. 13, 2016, with English translation.

* cited by examiner

IMAGING SYSTEM, OBJECT DETECTION DEVICE AND METHOD OF OPERATING SAME

CROSS-REFERENCE TO RELATED APPLICATIONS

This application is a Continuation of PCT International Application No. PCT/JP2016/080368 filed on Oct. 13, 2016, which claims priority under 35 U.S.C § 119(a) to Japanese Patent Application No. 2015-210534 filed on Oct. 27, 2015. Each of the above application(s) is hereby expressly incorporated by reference, in its entirety, into the present application.

BACKGROUND OF THE INVENTION

1. Field of the Invention

The present invention relates to an imaging system, and more particularly to an imaging system including an imaging device which images visible light and an imaging device which images infrared light. In addition, the present invention relates to an object detection device included in the above-described imaging system, and a method of operating the same.

2. Description of the Related Art

An imaging system including a visible light camera and an infrared light camera is known (for example, JP2014-157452A). In JP2014-157452A, the visible light camera and the infrared light (far-infrared light) camera image an object area in which a detection of an object is performed, with almost the same angle and almost the same imaging magnification. In JP2014-157452A, the object detection is carried out in each of a visible light image captured by the visible light camera and an infrared light image (temperature distribution image) captured by the far-infrared light camera.

In JP2014-157452A, before the object detection, for example, an overexposed or underexposed region in the visible light image is extracted as an image region which is not appropriate for the object detection, and the object detection is carried out by excluding the region thereof with respect to the visible light image. For the infrared light image, in a region except for the region extracted as the image region which is not appropriate for the object detection in the visible light image, the object detection is carried out. Results of two such object detections are integrated with each other, and thus a result of the object detection for the entire image is obtained.

In general, in the visible light image, a situation in which it is difficult to appropriately carry out the object detection occurs due to a backlight or the like in some cases. In JP2014-157452A, a region in which such a situation occurs is extracted as the image region which is not appropriate for the object detection in the visible light image, and the object detection in the infrared light image is carried out with respect to the image region. Therefore, an effect in which it is possible to improve precision of the object detection may be expected.

SUMMARY OF THE INVENTION

However, the situation in which it is difficult to appropriately carry out the object detection may occur in the infrared light image as well as the visible light image. For example, in a case in which a thing having a temperature close to that of a surface of a person is present in a background of the person, it is impossible to distinguish the person and the object of the background from each other, and it is difficult to correctly detect the object. In JP2014-157452A, the image region which is not appropriate for the object detection in the infrared light image is not considered. In JP2014-157452A, the object detection is performed by the far-infrared light image with respect to the image region which is not appropriate for the object detection in the visible light image. However, in the infrared light image, the image region may not be appropriate for the object detection.

In addition, in JP2014-157452A, with respect to the infrared light image, the fact that the object detection may be performed in the entire image as well as the image region which is not appropriate for the object detection in the visible light image is disclosed. However, in this case, there is no specific disclosure regarding how to integrate a result of the object detection for the infrared light image carried out with respect to the entire image with a result of the object detection for the visible light image carried out with respect to the region except for the image region which is not appropriate for the object detection.

Here, JP2004-163257A discloses that an object detection (face detection) is performed in each of a plurality of images, and the position in which the face of a detection target is present is decided on the basis of such as result. In JP2004-163257A, two imaging devices are used, and the face detection is performed in a pair of an image (first image) captured by using one imaging device and an image (second image) captured by using another imaging device. JP2004-163257A discloses that a weighted addition is performed on a score calculated by the face detection for the first image and a score calculated by the face detection for the second image, and in a case in which a score obtained by the weighted addition is equal to or greater than a threshold value, it is determined that the face is present. Regarding the imaging device, JP2004-163257A discloses that the one imaging device may be a device including color filters of Red (R), Green (G), and Blue (B) in the front surface of a visible light sensor (imaging element), and the other imaging device may be a device including an infrared (IR) filter which penetrates light components of an infrared light region penetrates in the front surface of the visible light sensor.

However, in general, the visible light sensor does not have sensitivity to far-infrared light, and thus the captured infrared light image in JP2004-163257A is a near-infrared light image rather than a far-infrared light image. In addition, in JP2004-163257A, a situation in which it is difficult to appropriately carry out the object detection in the visible light image, and a situation in which it is difficult to appropriately carry out the object detection in the infrared light image are not considered. Therefore, in JP2004-163257A, in a case in which an object is detected by using the visible light image and the infrared light image, and in a case in which a situation where it is difficult to appropriately carry out the object detection in the infrared light image occurs, it is impossible to correctly detect the object.

The present invention is made in consideration of such a circumstance, and an object of the present invention is to provide an object detection device and a method of operating the same capable of correctly detecting an object, even in a case in which a situation where it is difficult to appropriately carry out the object detection in the infrared light image occurs in the detection of object by using a visible light image and an infrared light image.

In addition, another object of the present invention is to provide an imaging system including the above-described object detection device.

In order to achieve the object, the present invention provides an imaging system comprising: a first imaging device that images infrared light; a second imaging device that images visible light; a first object candidate region extraction unit that extracts a first object candidate region where an object is expected to be present from an infrared light image captured by the first imaging device; a second object candidate region extraction unit that extracts a second object candidate region where the object is expected to be present from a visible light image captured by the second imaging device; a score integration unit that calculates an integration evaluation value by performing a weighted addition of a first evaluation value indicating a degree of likelihood of the object in the first object candidate region and a second evaluation value indicating the degree of likelihood of the object in the second object candidate region; a weight decision unit that decides a first weight for the first evaluation value and a second weight for the second evaluation value in the weighted addition, on the basis of at least one of a surrounding environmental temperature or an amount of infrared light energy emitted from an imaging region; an object region determination unit that determines an object region where the object is present on the basis of the integration evaluation value; and an exposure correction unit that decides an amount of an exposure correction on the basis of a pixel signal value within the object region in the visible light image and carries out the exposure correction of the visible light image.

Here, in a case in which the infrared light is emitted from the imaging region of the first imaging device, the first imaging device detects the infrared light by a signal intensity according to an amount of emitted energy thereof. The signal intensity of the infrared light detection signal corresponds to a pixel value of the infrared light image. In the present invention, it is possible to discriminate the amount of the infrared light energy emitted from the imaging region from the pixel value of the infrared light image captured by the first imaging device.

In the present invention, the object may be a person. The weight decision unit may decide the weight on the basis of the environment temperature. In this case, in a case in which T1 is assumed as a temperature lower than an average human body temperature, and T2 is assumed as a temperature higher than the average human body temperature, it is preferable that the first weight is set to be less than the second weight, in a case in which the environment temperature is in a temperature range equal to or higher than T1 and is equal to or lower than T2.

In the above description, in a temperature range in which the environment temperature is equal to or higher than a temperature lower than T1 by 5° C. and is equal to or lower than T1, the weight decision unit may gradually increase the first weight from the first weight of a case in which the environment temperature is T1 as the environment temperature is lowered from T1, and/or in a temperature range in which the environment temperature is equal to or higher than T2 and is equal to or lower than a temperature higher than T2 by 5° C., the weight decision unit may gradually increase the first weight from the first weight of a case in which the environment temperature is T2 as the environment temperature is increased from T2.

The weight decision unit may decide the weight on the basis of the amount of the infrared light energy. In this case, in a case in which the amount of the infrared light energy emitted from the object is set as Et, and E1 and E2 are set as positive real numbers, the first weight may be set to be less than the second weight, in a case in which the first object candidate region does not include a pixel having a pixel value corresponding to the amount of the infrared light energy which is equal to or greater than Et−E1 and is equal to or less than Et+E2.

In the present invention, the object may be a person. The weight decision unit may decide the weight on the basis of the environment temperature and the amount of the infrared light energy. In a case in which T1 is assumed as a temperature lower than an average human body temperature, T2 is assumed as a temperature higher than the average human body temperature, the amount of the infrared light energy emitted from the object is set as Et, and E1 and E2 are set as positive real numbers, the first weight may be set to be less than the second weight, in a case in which the environment temperature is in a temperature range which is equal to or higher than T1 and is equal to or lower than T2, and the first object candidate region does not include a pixel having a pixel value corresponding to the amount of the infrared light energy which is equal to or greater than Et−E1 and is equal to or less than Et+E2.

The imaging system according to the present invention may further comprise a backlight determination unit that determines whether or not a backlight state is present in the visible light image on the basis of a luminance histogram of the visible light image. In this case, the weight decision unit may adjust at least one of the first weight or the second weight on the basis of a determination result of the backlight determination unit.

In a case in which the backlight determination unit determines that a state is the backlight state, the weight decision unit may increase the first weight so as to be greater than a first weight decided on the basis of at least one of the environment temperature or the amount of the infrared light energy, and/or may reduce the second weight so as to be less than a second weight decided on the basis of the at least one of the environment temperature or the amount of the infrared light energy.

The imaging system according to the present invention may further comprise a scene recognition unit that recognizes an imaging scene including at least one of a landscape, a sea, a snow, or a mountain, on the basis of the visible light image. In this case, the weight decision unit may adjust at least one of the first weight or the second weight on the basis of a result of scene recognition of the scene recognition unit.

In a case in which the imaging scene is recognized as the landscape, the sea, the snow, or the mountain by the scene recognition unit, the weight decision unit may increase the first weight so as to be greater than a first weight decided on the basis of at least one of the environment temperature or the amount of the infrared light energy, and/or may reduce the second weight so as to be less than a second weight decided on the basis of the at least one of the environment temperature or the amount of the infrared light energy.

The imaging system according to the present invention may further comprise a low temperature region determination unit that determines whether or not an area of a region where a temperature is equal to or less than a first threshold value is included in the infrared light image by a value equal to or greater than a second threshold value. In this case, the weight decision unit may adjust at least one of the first weight or the second weight on the basis of a determination result of the low temperature region determination unit.

In a case in which the low temperature region determination unit determines that the area of the region where the temperature is equal to or less than the first threshold value is included in the infrared light image by a value equal to or greater than the second threshold value, the weight decision unit may increase the first weight so as to be greater than a first weight decided on the basis of at least one of the environment temperature or the amount of the infrared light energy, and/or may reduce the second weight so as to be less than a second weight decided on the basis of the at least one of the environment temperature or the amount of the infrared light energy.

The imaging system according to the present invention may further comprise a shield object determination unit that determines whether or not a shield object which shields the infrared light is present between the first imaging device and the object on the basis of the visible light image and the infrared light image. In this case, the weight decision unit may adjust at least one of the first weight or the second weight on the basis of a determination result of the shield object determination unit.

In a case in which the shield object determination unit determines that the shield object is present between the first imaging device and the object, the weight decision unit may reduce the first weight so as to be less than a first weight decided on the basis of at least one of the environment temperature or the amount of the infrared light energy, and/or may increase the second weight so as to be greater than a second weight decided on the basis of the at least one of the environment temperature or the amount of the infrared light energy.

In the imaging system according to the present invention, the exposure correction may include, for example, a process of adjusting a brightness of the visible light image on the basis of a histogram of a pixel signal value within the object region in the visible light image. Alternatively, the exposure correction may include a process of adjusting an exposure time in the second imaging device.

In addition, the present invention provides an object detection device comprising: a first object candidate region extraction unit that extracts a first object candidate region where an object is expected to be present from an infrared light image captured by a first imaging device which images infrared light; a second object candidate region extraction unit that extracts a second object candidate region where the object is expected to be present from a visible light image captured by a second imaging device which images visible light; a score integration unit that calculates an integration evaluation value by performing a weighted addition of a first evaluation value indicating a degree of likelihood of the object in the first object candidate region and a second evaluation value indicating the degree of likelihood of the object in the second object candidate region; a weight decision unit that decides a first weight for the first evaluation value and a second weight for the second evaluation value in the weighted addition, on the basis of at least one of a surrounding environmental temperature or an amount of infrared light energy emitted from an imaging region; and an object region determination unit that determines an object region where the object is present on the basis of the integration evaluation value.

In addition, the present invention provides a method of operating an object detection device, comprising: a step of extracting a first object candidate region where an object is expected to be present from an infrared light image captured by a first imaging device which images infrared light; a step of extracting a second object candidate region where the object is expected to be present from a visible light image captured by a second imaging device which images visible light; a step of deciding a first weight for a first evaluation value indicating a degree of likelihood of the object in the first object candidate region, and a second weight for a second evaluation value indicating the degree of likelihood of the object in the second object candidate region, on the basis of at least one of a surrounding environmental temperature or an amount of infrared light energy emitted from an imaging region; a step of calculating an integration evaluation value by performing a weighted addition of the first evaluation value and the second evaluation value by using the first weight and the second weight; and a step of determining an object region where the object is present on the basis of the integration evaluation value.

In the imaging system, the object detection device, and the method of operating the same according to the present invention, extracting the object candidate region is performed on each of the infrared light image captured by the first imaging device and the visible light image captured by the second imaging device. The first evaluation value in the first object candidate region extracted from the infrared light image and the second evaluation value in the second object candidate region extracted from the visible light image are integrated with each other by the weighted addition, and the object region is determined on the basis of the integration evaluation value obtained by the weighted addition. In the present invention, the weight of the weighted addition is decided on the basis of at least one of the environment temperature or the amount of the infrared light energy emitted from the imaging region. Therefore, it is possible to correctly detect the object even in a case in which a situation where it is difficult to appropriately carry out the object detection in the infrared light image occurs.

DESCRIPTION OF THE PREFERRED EMBODIMENTS

Figure 1:
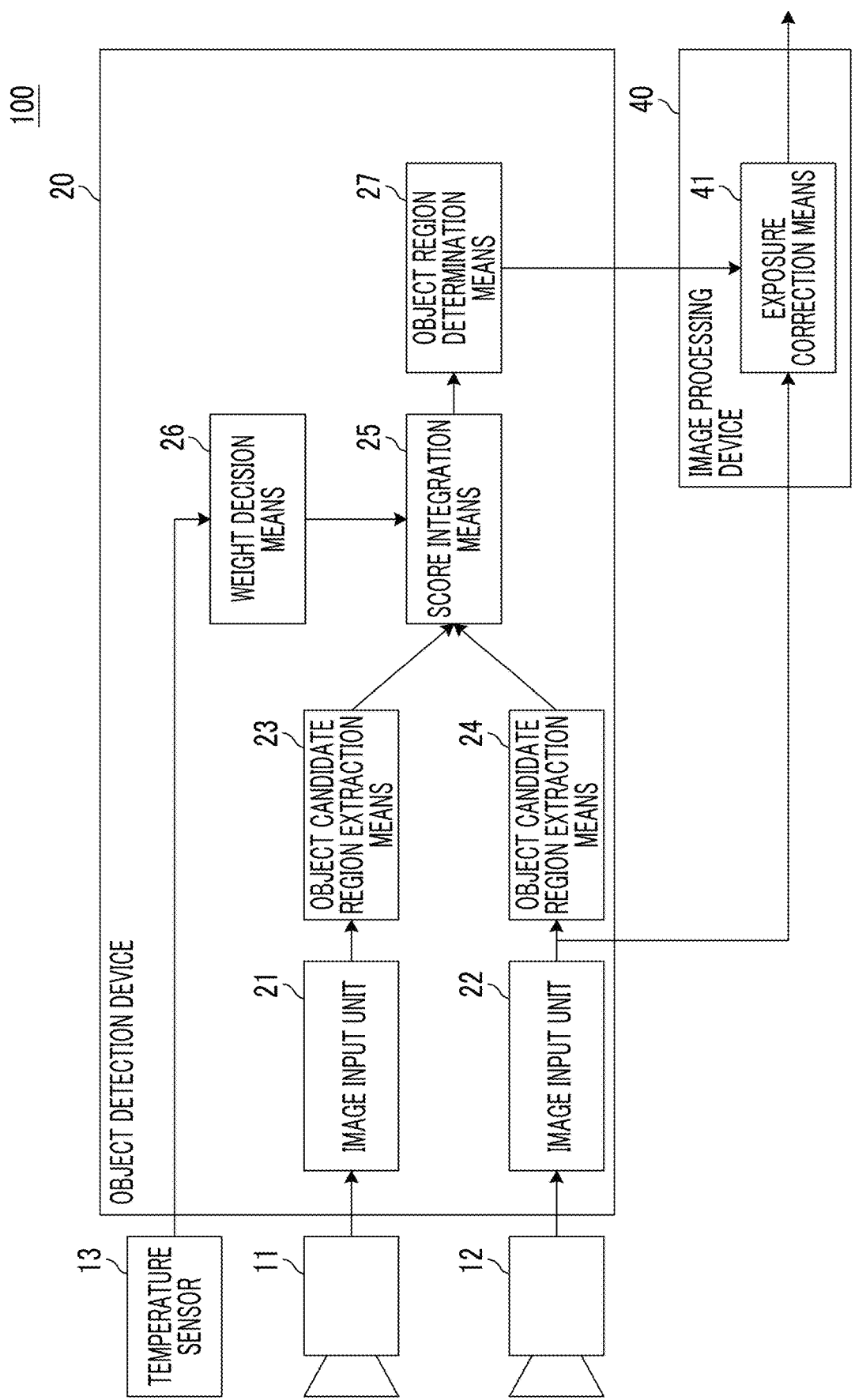
FIG. 1 is a block diagram illustrating an imaging system according to a first embodiment of the present invention.

Hereinafter, an embodiment of the present invention will be described in detail with reference to the drawings. FIG. 1 is a block diagram illustrating an imaging system according to a first embodiment of the present invention. The imaging system 100 includes an infrared light imaging device 11, a visible light imaging device 12, an object detection device 20, and an image processing device 40. The object detection device 20 includes image input units 21 and 22, object candidate region extraction means 23 and 24, score integration means 25, weight decision means 26, and object region determination means 27. The image processing device 40 includes exposure correction means 41.

For example, the object detection device 20 and the image processing device 40 are configured as a computer device having a processor, the processor is operated according to a program, and thus functions of each unit are realized. The object detection device 20 and the image processing device 40 may have a Large Scale Integration (LSI) such as a Digital Signal Processor (DSP), and may have a Programmable Logic Device (PLD) such as a Field-Programmable Gate Array (FPGA). In addition, the object detection device 20 and the image processing device 40 may not be separated from each other as individual devices, and a portion functioning as the object detection device 20 and a portion functioning as the image processing device 40 may be configured in one device.

The infrared light imaging device 11 is a first imaging device, and images infrared light. The infrared light imaging device 11 typically includes an image forming optical system which has one or more lenses, and an infrared light imaging element (infrared sensor) which images an optical image formed by the image forming optical system and converts the optical image into an electrical signal. For example, the infrared sensor detects infrared light of a wavelength range of 0.83 μm to 1000 μm. In particular, it is preferable that the infrared sensor detects far-infrared light of a wavelength range of from 6 μm to 1000 μm. As the infrared sensor, a thermal infrared sensor such as a micro bolometer or a Silicon on Insulator (SOI) diode type may be used.

The visible light imaging device 12 is a second imaging device, and images visible light. The visible light imaging device 12 typically includes an image forming optical system which has one or more lenses, and a visible light imaging element (visible light sensor) which images an optical image formed by the image forming optical system and converts the optical image into an electrical signal. For example, the visible light sensor detects visible light of a wavelength range of from approximately 380 nm to approximately 750 nm. The visible light sensor may have sensitivity in at least part of a wavelength region of a near-infrared light. The infrared light imaging device 11 and the visible light imaging device 12 image almost the same imaging region.

The image input unit 21 inputs the infrared light image captured by the infrared light imaging device 11. The object candidate region extraction means (first object candidate region extraction unit) 23 extracts a first object candidate region where an object is expected to be present from the infrared light image. The first object candidate region extraction means 23 may extract a plurality of first object candidate regions from one infrared light image. For example, the first object candidate region extraction means 23 includes a plurality of cascaded weak discriminators. For example, the weak discriminator group in the first object candidate region extraction means 23 is constructed by ensemble learning using a boosting such as Adaboost.

For example, the first object candidate region extraction means 23 extracts a feature amount from the infrared light image, and calculates a suitability of the extracted feature amount with respect to a reference feature amount, so as to extract the first object candidate region. Examples of the feature amount may include a luminance feature amount such as a luminance distribution, various wavelet feature amounts, an Haar-like feature amount, an Edgelet feature amount, an Edge of Orientation Histogram (EOH) feature amount, a Histograms of Oriented Gradients (HOG) feature amount, and the like.

The image input unit 22 inputs the visible light image captured by the visible light imaging device 12. The object candidate region extraction means (second object candidate region extraction unit) 24 extracts a second object candidate region where the object is expected to be present from the visible light image. Extracting the second object candidate region in the second object candidate region extraction means 24 may be the same as extracting the first object candidate region in the first object candidate region extraction means 23, except for the point that the image of an extraction source of the feature amount is changed from the infrared light image to the visible light image. The type of the feature amount extracted from the infrared light image by the first object candidate region extraction means 23 may be equal to the type of the feature amount extracted from the visible light image in the second object candidate region extraction means 24. Alternatively, the type of the feature amount extracted from the image by the first object candidate region extraction means 23 may be different from the type of the feature amount extracted from the image by the second object candidate region extraction means 24.

An algorithm used in extracting the object candidate region in the first object candidate region extraction means 23 and the second object candidate region extraction means 24 is not particularly limited. For example, the first object candidate region extraction means 23 and the second object candidate region extraction means 24 may extract the object candidate region by a pattern matching or a neural network, particularly, a deep learning which is a type thereof.

In the present embodiment, mainly a person is considered as the object of the detection. The first object candidate region extraction means 23 outputs a first evaluation value indicating a degree of likelihood of the object, for each extracted first object candidate region. The second object candidate region extraction means 24 outputs a second evaluation value indicating a degree of likelihood of the object, for each extracted second object candidate region. For example, as the first evaluation value is high, it is highly possible that a person who is the object of the detection is present in a portion extracted as the first object candidate region in the infrared light image. In addition, as the second evaluation value is high, it is highly possible that a person is present in a portion extracted as the second object candidate region in the visible light image.

The score integration means (score integration unit) 25 calculates an integration evaluation value by performing a weighted addition of the first evaluation value output from the first object candidate region extraction means 23 and the second evaluation value output from the second object candidate region extraction means 24. The weight decision means (weight decision unit) 26 decides a first weight for the first evaluation value and a second weight for the second evaluation value in the weighted addition by the score integration means 25 on the basis of the measurement result of the temperature sensor 13 measuring the environment temperature. It is preferable that the first weight and the second weight are standardized such that the total value thereof becomes 1. The descriptions of the decision of the weight will be given later. Here, one of the first weight and the second weight may be zero. That is, as a result of the weighted addition, only the first evaluation value may be included in the integration evaluation value, and only the second evaluation value may be included in the integration evaluation value.

The object region determination means (object region determination unit) 27 determines a region where the object is present on the basis of the integration evaluation value calculated by the score integration means 25. For example, the object region determination means 27 determines an object candidate region in which the integration evaluation value is equal to or greater than a threshold value of an evaluation value as the region (object region) where the object is present. The exposure correction means (exposure correction unit) 41 carries out an exposure correction process with respect to the visible light image captured by the visible light imaging device 12. More specifically, the exposure correction means 41 decides an amount of an exposure correction on the basis of a pixel signal value within the object region in the visible light image, and carries out the exposure correction of the visible light image by the amount of the exposure correction thereof.

For example, the exposure correction includes a process of adjusting the brightness of the visible light image on the basis of a histogram of the pixel signal value within the object region in the visible light image. For example, the exposure correction means 41 may carry out the exposure correction of the visible light image by a method equal to a normal method of a backlight correction of an image, and may increase the width of the histogram in the object region such that the width of the histogram in the object region becomes greater than that before the correction. The exposure correction means 41 may perform the exposure correction with respect to only a portion of the object region, and may perform the exposure correction with respect to the entire image. In a case in which a plurality of object regions are present, the exposure correction means 41 may perform the exposure correction with respect to each of the object regions. Alternatively, the exposure correction means 41 may decide an amount of the exposure correction on the basis of a pixel signal value in any of the plurality of object regions, for example, an object region of which the area is the maximum, and may perform the exposure correction on the entire image by the amount of the exposure correction thereof.

The image after the exposure correction by the exposure correction means 41 is output as an output image of the imaging system 100. For example, the output image is stored in an auxiliary storage device, which is not shown, such as a hard disk device. The auxiliary storage device may be installed in a place different from the imaging system 100. The auxiliary storage device may receive the visible light image from the imaging system 100 through a network such as the Internet, and may store the visible light image. The auxiliary storage device may store the visible light image before the correction in addition to the visible light image after the correction. In addition, the auxiliary storage device may store the infrared light image as well as the visible light image.

Hereinafter, the decision of the weight in the weight decision means 26 is described. In the infrared light image, even in a case in which anything is present in a background of the object (person), as long as there is a difference between an amount of infrared light energy emitted from the thing of the background and an amount of infrared light energy emitted from the person, it is possible to extract the object candidate region from the infrared light image. However, in the infrared light image, in a situation in which there is no difference between the amount of the infrared light energy emitted from the thing of the background and the amount of the infrared light energy emitted from the person, and thus it is impossible to distinguish the person from the thing of the background in the infrared light image, it is impossible to extract the object candidate region, or the evaluation value (first evaluation value) of the extracted object candidate region is reduced.

In the present embodiment, in consideration of the point that the amount of the infrared light energy emitted from the thing changes according to an environment temperature, in a case in which a temperature is in a specific range, it is considered that the weight (first weight) in the first evaluation value is reduced. In a case in which the temperature is set as T[K], the amount (I(T)) of the infrared light energy emitted from the thing is calculated by the following expression by a Stefan-Boltzmann expression, by using σ as a Stefan-Boltzmann constant $(5.67 \times 10-8[W \cdot m^{-2} \cdot K^{-4}])$.

$$I = \sigma \times T^4 \quad (1)$$

The amount of the infrared light energy calculated by Expression (1) is the total amount of the energy over the entire wavelength range. Originally, although it is preferable that the amount of energy in a desirable wavelength range, for example, in a wavelength range of from 8 μm to 14 μm is calculated, and a comparison is performed, here, for a simplification of the description, it is assumed that the energy calculated by Expression (1) is the amount of the energy in the desirable wavelength range for the description.

The amount of the emitted energy depends on an emissivity of each thing, except for the thing temperature. For example, in a case in which the amount of the infrared light energy calculated by Expression (1) is an amount emitted from a complete black body (emissivity ε=1), the amount of the infrared light energy emitted from a thing (for example, skin of person) of which the temperature is the same as the complete black body and of which the emissivity ε is 0.98 is a value obtained by multiplying the amount of the infrared light energy calculated by Expression (1) and 0.98. A summary of the amount of the infrared light energy emitted from various things in a temperature range of 35° C. to 45° C. is shown in the following Table 1.

TABLE 1

| | Emissivity | Infrared light energy at each temperature (W/cm²) | | | | | | | | | |
| --- | --- | --- | --- | --- | --- | --- | --- | --- | --- | --- | --- |
| | | 35° C. | 36° C. | 37° C. | 38° C. | 39° C. | 40° C. | 41° C. | 42° C. | 43° C. | 44° C. | 45° C. |
| Skin | 0.98 | 0.0503 | 0.0509 | 0.0516 | 0.0523 | 0.0529 | 0.0536 | — | — | — | — | — |
| Black body | 1 | 0.0513 | 0.0520 | 0.0526 | 0.0533 | 0.0540 | 0.0547 | 0.0554 | 0.0561 | 0.0568 | 0.0576 | 0.0583 |
| Asphalt | 0.85 | 0.0436 | 0.0442 | 0.0447 | 0.0453 | 0.0459 | 0.0465 | 0.0471 | 0.0477 | 0.0483 | 0.0489 | 0.0495 |
| Concrete | 0.9 | 0.0462 | 0.0468 | 0.0474 | 0.0480 | 0.0486 | 0.0492 | 0.0499 | 0.0505 | 0.0512 | 0.0518 | 0.0525 |
| Glass | 0.85 | 0.0436 | 0.0442 | 0.0447 | 0.0453 | 0.0459 | 0.0465 | 0.0471 | 0.0477 | 0.0483 | 0.0489 | 0.0495 |
| Plastic | 0.95 | 0.0487 | 0.0494 | 0.0500 | 0.0507 | 0.0513 | 0.0520 | 0.0526 | 0.0533 | 0.0540 | 0.0547 | 0.0554 |
| Iron | 0.85 | 0.0436 | 0.0442 | 0.0447 | 0.0453 | 0.0459 | 0.0465 | 0.0471 | 0.0477 | 0.0483 | 0.0489 | 0.0495 |
| Tree (planted) | 0.6 | 0.0308 | 0.0312 | 0.0316 | 0.0320 | 0.0324 | 0.0328 | 0.0332 | 0.0337 | 0.0341 | 0.0345 | 0.0350 |
| Soil | 0.98 | 0.0503 | 0.0509 | 0.0516 | 0.0523 | 0.0529 | 0.0536 | 0.0543 | 0.0550 | 0.0557 | 0.0564 | 0.0571 |
| Water | 0.93 | 0.0477 | 0.0483 | 0.0490 | 0.0496 | 0.0502 | 0.0509 | 0.0515 | 0.0522 | 0.0529 | 0.0535 | 0.0542 |
| Cloth | 0.98 | 0.0503 | 0.0509 | 0.0516 | 0.0523 | 0.0529 | 0.0536 | 0.0543 | 0.0550 | 0.0557 | 0.0564 | 0.0571 |
| Wood | 0.9 | 0.0462 | 0.0468 | 0.0474 | 0.0480 | 0.0486 | 0.0492 | 0.0499 | 0.0505 | 0.0512 | 0.0518 | 0.0525 |

The body temperature of a person is generally in a range of from 36° C. to 37° C. However, it is assumed that the skin temperature is changed in a range of from 35° C. to 40° C., by perspiration, pyrexia, rain and/or the like. In this case, an amount of infrared light energy emitted from a human body is in a degree of from 0.0503 W/cm² to 0.0536 W/cm². Referring to Table 1, in the range of the thing temperature from 35° C. to 45° C., a thing of which the amount of emitted infrared light energy is included in the range of from 0.0503 W/cm² to 0.0536 W/cm² which is a range of the emitted energy of the person is present. In a case in which the amount of the infrared light energy emitted from the thing is close to the amount of the emitted infrared light energy of the person, the signal intensities (pixel values in infrared light image) of the infrared light detection signals which are detected in the infrared light imaging device 11 become close to each other, and it is possible that the person is equalized to another thing in the infrared light image. In a case in which it is assumed that the thing temperature is equal to the air temperature, in the temperature range of the air temperature from 35° C. to 45° C., since it is possible that the person is equalized to the other thing in the infrared light image, it is considered that reliability of extracting the object candidate region from the infrared light image is low.

Therefore, in the present embodiment, in a case in which the temperature is in a temperature range where it is considered that the reliability of extracting the object candidate region in the infrared light image is low, the weight for the first evaluation value is set to be a low value, for example, zero. In addition, even in the vicinity of the temperature range, the weight is set to be comparatively low. By performing such weight setting, in a case in which there is a situation where the person is likely to be equalized to the thing of the background in the infrared light image, it is possible to suppress an influence of a result of the object candidate region using the infrared light image on a final determination of a person region.

For example, in a case in which the environment temperature is set as T, T1 is assumed as a temperature lower than an average human body temperature, and T2 is assumed as a temperature higher than the average human body temperature, the weight decision means 26 sets the first weight for the first evaluation value to be less than the second weight for the second evaluation value, in a case in which the environment temperature T is in a temperature range which is equal to or higher than T1 and is equal to or lower than T2 (T1≤T≤T2). T1 is, for example, 35° C., and T2 is, for example, 45° C. In a temperature range in which the environment temperature is lower than T1, for example, the environment temperature is equal to or higher than a temperature lower than T1 by 5° C. and is lower than T1 (T1−5° C.≤T<T1), the weight decision means 26 may gradually increase the first weight from a weight of a case in which the environment temperature is T1, as the environment temperature is reduced from T1. In addition, in a temperature range in which the environment temperature is higher than T2 and is equal to or lower than a temperature higher than T2, for example, a temperature higher than T2 by 5° C. (T2<T≤T2+5° C.), the weight decision means 26 may gradually increase the first weight from a weight of a case in which the environment temperature is T2, as the environment temperature is increased from T2.

Figure 2:
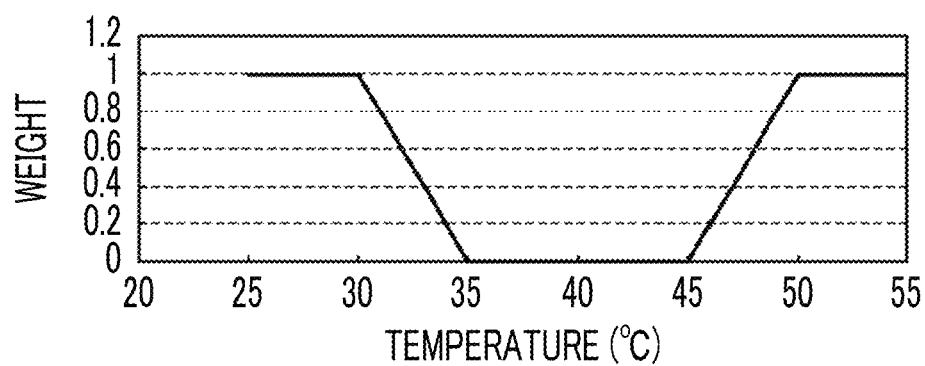
FIG. 2 is a graph illustrating an example of weight setting according to an environment temperature.

FIG. 2 illustrates an example of the weight setting according to the environment temperature. A graph illustrated in the same drawing illustrates a relationship between the environment temperature and the first weight α for the first evaluation value. The first weight α for the first evaluation value is a value which is equal to or greater than zero and is equal to or less than one. The second weight for the second evaluation value is (1−α). The integration evaluation value is calculated by the following expression.

Integration evaluation value=α×first evaluation value−(1−α)×second evaluation value In a case in which the weight setting illustrated in FIG. 2 is employed, the weight decision means 26 sets the first weight α for the first evaluation value as zero in a case in which the temperature measured by the temperature sensor 13 is in a temperature range which is equal to or higher than 35° C. and is equal to or lower than 45° C. In this temperature range, by setting the first weight as zero, the integration evaluation value is equal to the second evaluation value. In a case in which the environment temperature is equal to or lower than 30° C., and in a case in which the environment temperature is equal to or higher than 50° C., the weight decision means 26 sets the first weight for the first evaluation value as one. In this case, the integration evaluation value is equal to the first evaluation value. In a temperature range which is higher than 30° C. and is lower than 35° C., and in a temperature range which is higher than 45° C. and is lower than 50° C., the first weight α for the first evaluation value changes according to a change in the environment temperature.

In addition, in FIG. 2, the first weight α is set as zero in the temperature range which is equal to or higher than 35° C. and is equal to or lower than 45° C., however, in this temperature range, the first weight α may be comparatively less than the second weight (1−α), and the first weight is not limited to being set as zero. In addition, the first weight α is set as one in the temperature range which is equal to or lower than 30° C. and the temperature range which is equal to or higher than 50° C., however, in this temperature range, the first weight α may be comparatively greater than the second weight (1−α), and the first weight is not limited to being set as one. In the temperature range which is equal to or lower than 30° C., and/or in the temperature range which is equal to or higher than 50° C., the first weight α may be set as a random value which is greater than 0.5 and is less than one.

Figure 3A:
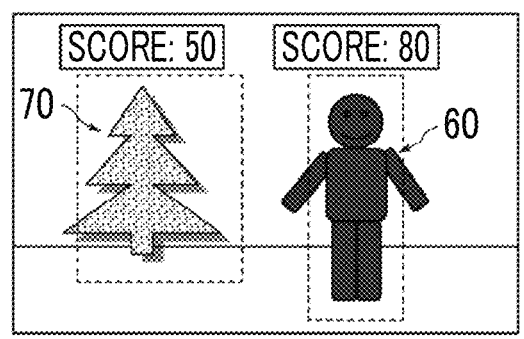
FIG. 3A is a diagram illustrating an example of a visible light image.
Figure 3B:
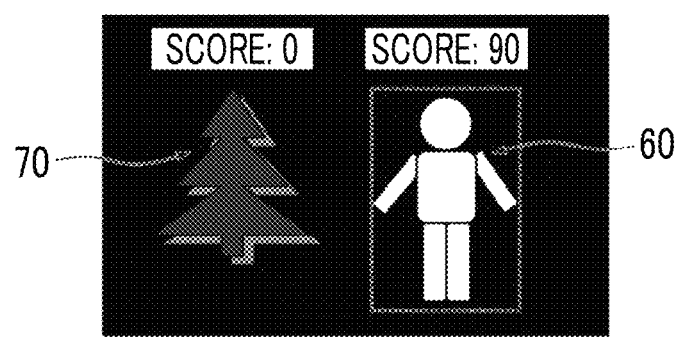
FIG. 3B is a diagram illustrating an example of an infrared light image.

FIG. 3A illustrates an example of the visible light image, and FIG. 3B illustrates an example of the infrared light image. In any image, two subjects of a person 60 and a tree 70 are imaged. In the visible light image illustrated in FIG. 3A, the exposure time at the time of imaging is short a little, and the person 60 is imaged blackly a little. As a result of carrying out the extraction of the object candidate region (person candidate region) by the second object candidate region extraction means 24 with respect to such a visible light image, the second evaluation value (score) "80" is obtained with respect to a region where the person 60 is present, and the second evaluation value "50" is obtained with respect to a region where the tree 70 is present. For example, in a case in which a threshold value of the evaluation value is set as "50" and a region where the evaluation value is equal to or greater than the threshold value is extracted as the person candidate region, in a state in which the extraction of the person candidate region is performed in only the visible light image, a pair of a region where the person 60 is present and a region where the tree 70 is present are extracted as the person candidate region.

The first object candidate region extraction means 23 carries out extracting the person candidate region with respect to the infrared light image illustrated in FIG. 3B. The first object candidate region extraction means 23 obtains the first evaluation value "90" with respect to the region where the person 60 is present, as a result of extracting the person candidate region. With respect to the tree 70, since the amount of the emitted infrared light energy is lower than that of the person 60, and is not clearly floated from the background differently from the person 60, the first evaluation value becomes low, for example, "zero". In this case, in a case in which the extraction of the person candidate region is performed in only the infrared light image, the region where the person 60 is present is extracted as the person candidate region.

The score integration means 25 performs the weighted addition of the obtained first evaluation value and second evaluation value. In a case in which each of the first weight for the first evaluation value and the second weight for the second evaluation value is 0.5, the integration evaluation value (integration score) calculated by the score integration means 25 with respect to the region where the person 60 is present is 90×0.5+80×0.5=85. On the other hand, the integration evaluation value calculated by the score integration means 25 with respect to the region where the tree 70 is present is 0×0.5+50×0.5=25. In a case in which the person region is determined on the basis of the integration evaluation value in the object region determination means 27, the integration evaluation value of the region where the person 60 is present is "85", is greater than the threshold value "50", and thus the region thereof is determined as a person region. Since the integration evaluation value is less than the threshold value, the region where the tree 70 is present is not determined as the person region. By using the infrared light image, it is possible to prevent incorrectly determining the tree 70, which is likely to be misrecognized as the person in a shape within the visible light image, as the person region.

Figure 4:
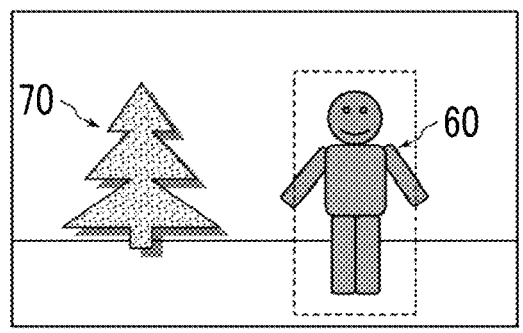
FIG. 4 is a diagram illustrating the visible light image after an exposure correction.

FIG. 4 illustrates the visible light image after the exposure correction. The exposure correction means 41 performs the exposure correction so that the region determined as the object region (person region) in the object region determination means 27 is appropriately exposed. By performing the exposure correction, in FIG. 3A, a histogram distribution of the pixel value of the person 60 which is crushed blackly a little is expanded to a region where the luminance value is high. Therefore, as illustrated in FIG. 4, eyes or a mouth and the like of the person 60 which is not able to be apparently discriminated in FIG. 3A is able to be visually recognized. In a case in which the exposure correction is performed with respect to the entire image, a subject which is present in a region except for the region where the person 60 is present, for example, the tree 70 is out of an appropriate exposure and is overexposed. However, an attentive subject in the image is the extracted object (person), and thus the case is not a big problem.

Figure 5A:
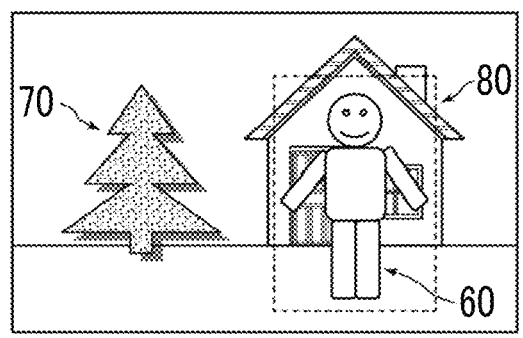
FIG. 5A is a diagram illustrating another example of the visible light image.
Figure 5B:
FIG. 5B is a diagram illustrating another example of the infrared light image.

FIG. 5A illustrates another example of the visible light image, and FIG. 5B illustrates another example of the infrared light image. In the visible light image illustrated in FIG. 5A and the infrared light image illustrated in FIG. 5B, the person 60, the tree 70, and a house 80 are imaged as subjects. The house 80 is behind the person 60 in a view from the imaging device side, and the person 60 and the house 80 spatially overlap and are imaged. In a case in which the person candidate region is extracted from the visible light image, although the person 60 and the house 80 overlap, it is possible to separate the person 60 from the house 80 by color information, and it is possible to extract the region where the person 60 is present as the person candidate region.

On the other hand, in a situation in which the air temperature is high, and there is not much difference between the amount of the infrared light energy emitted from the house 80 and the amount of the infrared light energy emitted from the person 60, as illustrated in FIG. 5B, the person 60 is equalized to the house 80 in the infrared light image. In this case, although the person candidate region is extracted from the infrared light image, a region where the evaluation value is high is not obtained. In a case in which the air temperature is low, and the house 80 is not heated, the person 60 is not equalized to the house 80 which is present in the background of the person in the infrared light image, and it is considered that it is possible to extract the region where the person 60 is present as the person candidate region, by extracting the person candidate region.

In the present embodiment, the first weight for the first evaluation value is decided on the basis of the temperature, and in a case in which the temperature measured by the temperature sensor 13 is included in a temperature range in which the person 60 is likely to be equalized to the house 80 of the background, as illustrated in FIG. 5B, the first weight is set as, for example, zero. In this case, since the person region is determined on the basis of only an extraction result of the person candidate region which is carried out with respect to the visible light image, even is a situation in which it is difficult to appropriately extract the person candidate region in the infrared light image, it is possible to determine that the region where the person 60 is present is the person region.

Figure 6:
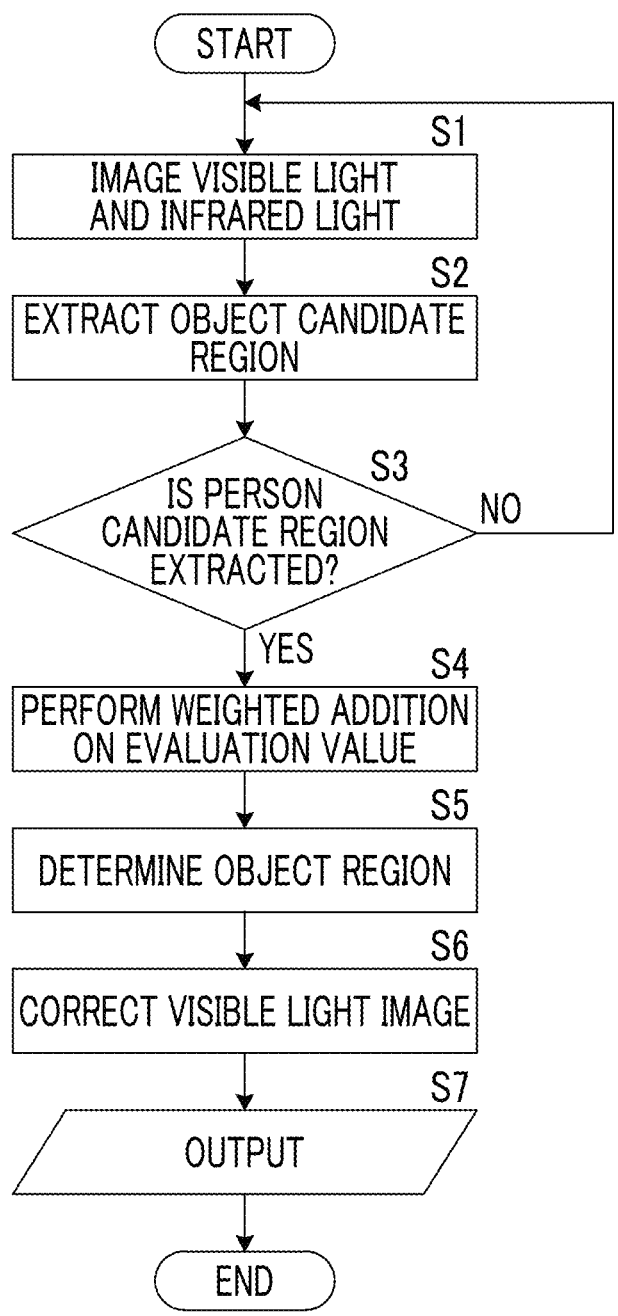
FIG. 6 is a flowchart illustrating an operation sequence of the imaging system.

Next, an operation sequence is described. FIG. 6 is a flowchart illustrating an operation sequence of the imaging system 100. The infrared light imaging device 11 captures the infrared light image, and the visible light imaging device 12 captures the visible light image (step S1). The first object candidate region extraction means 23 acquires the infrared light image through the image input unit 21, and extracts the object candidate region from the infrared light image (step S2). In addition, the second object candidate region extraction means 24 acquires the visible light image through the image input unit 22, and extracts the object candidate region from the visible light image.

The score integration means 25 determines whether or not the object candidate region is extracted by at least one of the first object candidate region extraction means 23 or the second object candidate region extraction means 24 (step S3). In a case in which the object candidate region is not extracted in any of the infrared light image and the visible light image, the sequence returns to step S1, and next infrared light image and visible light image are captured.

In a case in which it is determined that the object candidate region is extracted in at least one of the infrared light image or the visible light image, the score integration means 25 performs the weighted addition of the first evaluation value output from the first object candidate region extraction means 23 and the second evaluation value output from the second object candidate region extraction means 24, and calculates the integration evaluation value (step S4). The score integration means 25 performs the weighted addition of the first evaluation value and the second evaluation value by the weight which is decided by the weight decision means 26 in step S4 on the basis of the temperature measured by the temperature sensor 13. In a case in which there are the plurality of extracted object candidate regions, the weighted addition of the first evaluation value and the second evaluation value is performed with respect to each of the object candidate regions.

The object region determination means 27 determines the object region on the basis of the integration evaluation value calculated in step S4 (step S5). For example, in step S5, the object region determination means 27 determines whether or not the extracted object candidate region is the object region, by performing a threshold value process on the integration evaluation value. The object region determination means 27 notifies the exposure correction means 41 of the coordinate position and the like of the region determined as the object region. In a case in which a difference occurs in the imaging region within the infrared light image and the visible light image, the coordinate position and the like of the object region in the visible light image is notified to the exposure correction means 41, in consideration of the difference.

The exposure correction means 41 carries out the exposure correction process with respect to the visible light image captured step S1 (step S6). In step S6, the exposure correction means 41 acquires the pixel value of the pixel within the region determined as the object region in the visible light image. The exposure correction means 41 creates a histogram and the like of the acquired pixel value, performs an adjustment of a tone curve or an equalization of the histogram on the basis of the histogram, and carries out a gradation correction of the visible light image. The visible light image on which the exposure correction is performed is output as an output image of the imaging system 100 (step S7).

In the present embodiment, the extraction of the object candidate region is performed in each of the infrared light image and the visible light image. The integration evaluation value is calculated by performing the weighted addition of the evaluation value (first evaluation value) of the object candidate region extracted from the infrared light image and the evaluation value (second evaluation value) of the object candidate region extracted from the visible light image, and the object region is determined on the basis of the integration evaluation value. In the present embodiment, particularly, the weight of the weighted addition is decided on the basis of the environment temperature. In a situation in which the environment temperature is high and it is difficult to distinguish the object from the thing which is present in the background of the object, the weight for the first evaluation value is set as zero, or reduces the weight, and thus it is possible to determine the object region which emphasizes on a result of the object candidate region extraction in the visible light image. Therefore, by appropriately setting the weight for the first evaluation value and the weight for the second evaluation value, the determination of the object region according to characteristics of both images may be realized. In the present embodiment, it is possible to stably determine the person region in various situations by using the characteristics of the infrared light image and the visible light image. In particular, in a case in which a situation where it is difficult to appropriately carry out the detection of the object in the infrared light image occurs, it is possible to correctly determine the object region.

Even in a case in which a specific object, for example, a person is imaged as a main subject by the imaging system 100, an exposure is adjusted to another subject due to a factor such as a backlight and thus it is impossible to image the person by a desired exposure in some cases. In particular, in a scene where a light amount difference is large, due to a characteristic of a visible light camera, a person may cause overexposure—underexposure. In order to cope with this, various methods such as a backlight correction or an exposure correction using a face detection is proposed. However, the backlight correction corrects an exposure of an underexposed region as well as the person. In addition, the detection precision of the face detection is changed according to a posture or an angle, and thus it is unstable to stably determine the person region. In the present embodiment, information on the infrared light image and information on the visible light image are used by combining the information on the infrared light image and information on the visible light image with each other according to the situation, and thus it is possible to stably determine the person region. Since it is possible to stably determine the person region, it is possible to perform an appropriate exposure correction which is adjusted to the region thereof, and it is possible to largely improve use convenience of a device for imaging a specific object, such as a surveillance camera.

Figure 7:
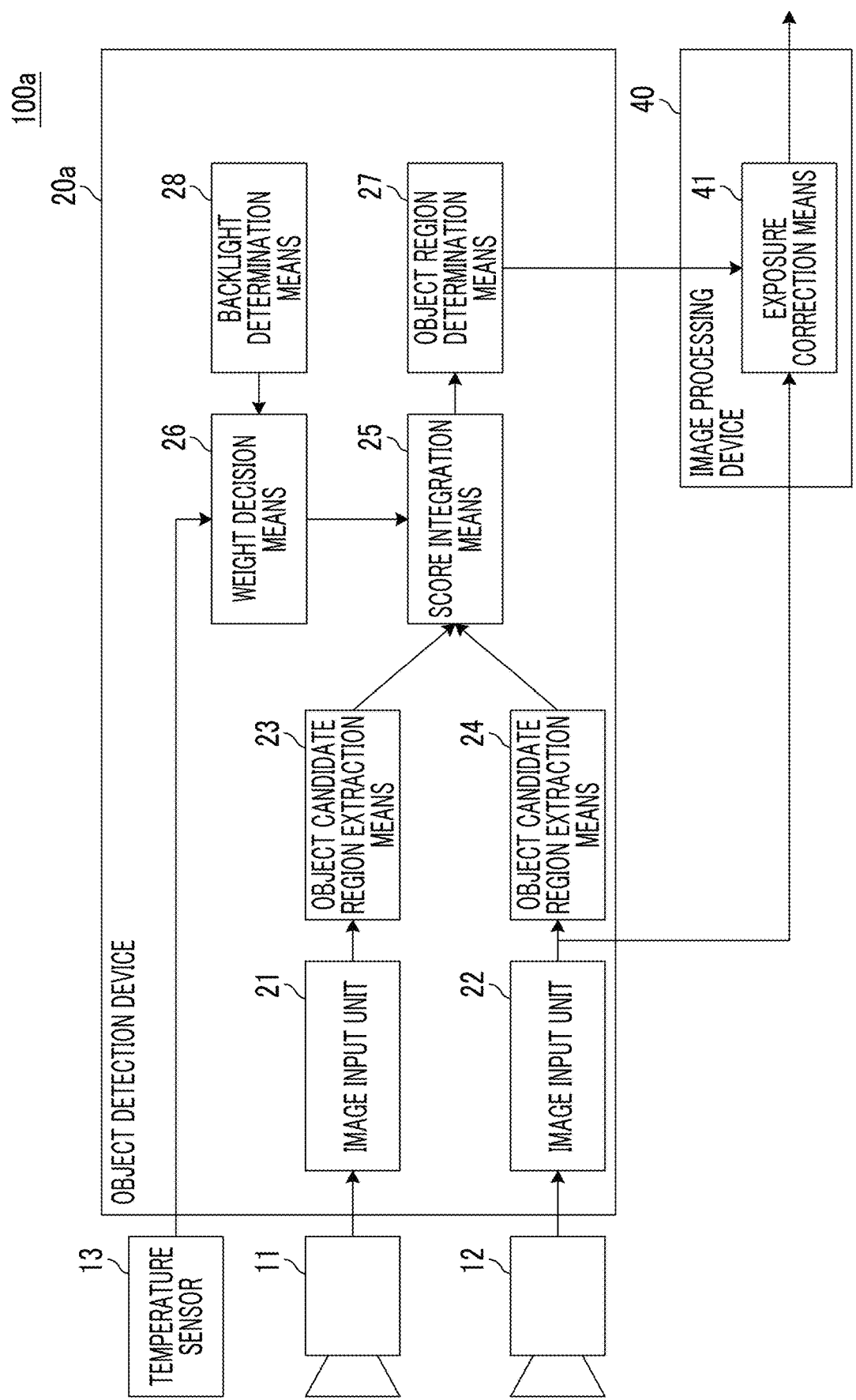
FIG. 7 is a block diagram illustrating an imaging system according to a second embodiment of the present invention.

Next, a second embodiment of the present invention will be described. FIG. 7 is a block diagram illustrating an imaging system according to the second embodiment of the present invention. An imaging system 100a of the present embodiment is different from the imaging system 100 according to the first embodiment illustrated in FIG. 1, in a point that the imaging system 100a includes backlight determination means 28 in an object detection device 20a. Other configurations are the same as those of the first embodiment.

The backlight determination means (backlight determination unit) 28 determines whether or not a backlight state is present in the visible light image. The backlight determination means 28 determines whether or not the backlight state is present by determining whether or not the luminance value is biased to a portion close to a black on the basis of, for example, the luminance histogram of the visible light image. The weight decision means 26 adjusts at least one of the first weight for the first evaluation value or the second weight for the second evaluation value on the basis of a determination result of the backlight determination means 28. Here, adjusting the weight refers to increasing or reducing the weight decided on the basis of the environment temperature. For example, adjusting the weight refers to adding or subtracting an adjustment amount on the basis of the result of the backlight determination to or from the weight which is decided on the basis of the environment temperature. Alternatively, the weight may be adjusted by multiplying the weight which is decided on the basis of the temperature by the result of a coefficient on the basis of the backlight determination.

Figure 8A:
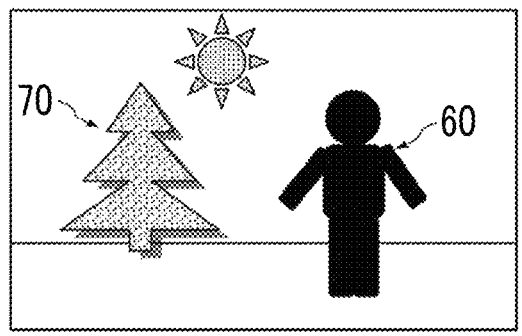
FIG. 8A is a diagram illustrating an example of the visible light image.
Figure 8B:
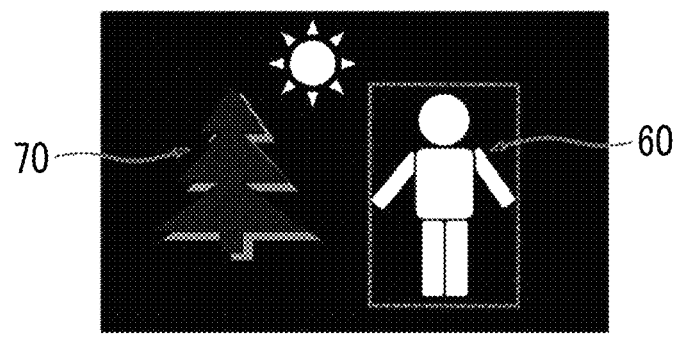
FIG. 8B is a diagram illustrating an example of the infrared light image.

FIG. 8A illustrates an example of the visible light image, and FIG. 8B illustrates an example of the infrared light image. In a case in which the sun and the like are present in the background, the backlight state is generated in the visible light image, as illustrated in FIG. 8A, a region of the person 60 and the tree 70 is crushed blackly. In this case, in comparison with a case in which the backlight state is not generated, it is difficult to extract the object candidate region (person candidate region) from the visible light image. On the other hand, in the infrared light image, even in a case in which the backlight state is generated, the person 60 is clearly imaged, and there is no hindrance to extract the person candidate region. Therefore, in a case in which the backlight state is generated, it is preferable that the determination of the object is performed by emphasizing the result of the person candidate region in the infrared light image, rather than a case in which the backlight state is not generated.

It is preferable that the weight decision means 26 comparatively reduces the second weight for the second evaluation value in a case in which the backlight determination means 28 determines that a state is the backlight state. For example, the weight decision means 26 increases the first weight for the first evaluation value so as to be greater than the weight decided on the basis of the environment temperature according to the graph illustrated in FIG. 2. Alternatively or additionally, the weight decision means 26 may reduce the second weight for the second evaluation value so as to be less than the weight decided on the basis of the environment temperature.

Figure 9:
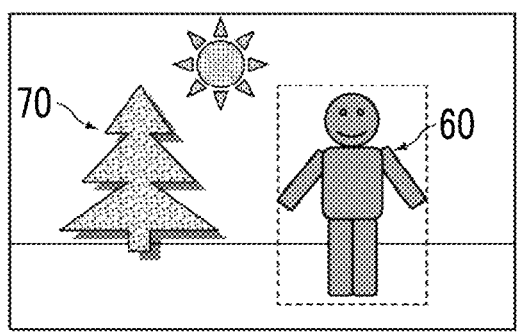
FIG. 9 is a diagram illustrating the visible light image after the exposure correction.

FIG. 9 illustrates the visible light image after the exposure correction. The exposure correction means 41 performs the exposure correction so that the region determined as the object region (person region) in the object region determination means 27 is appropriately exposed. By performing the exposure correction, the person 60 which is crushed blackly in FIG. 8A is drawn with an appropriate exposure.

In the present embodiment, the backlight determination means 28 determines whether or not the backlight state is present in the visible light image. In a case in which the backlight state is generated, the second weight for the second evaluation value is comparatively reduced, and thus it is possible to increase a specific gravity of the first evaluation value in the integration evaluation value and it is possible to stably perform the determination of the object. Other effects are the same as those of the first embodiment.

Figure 10:
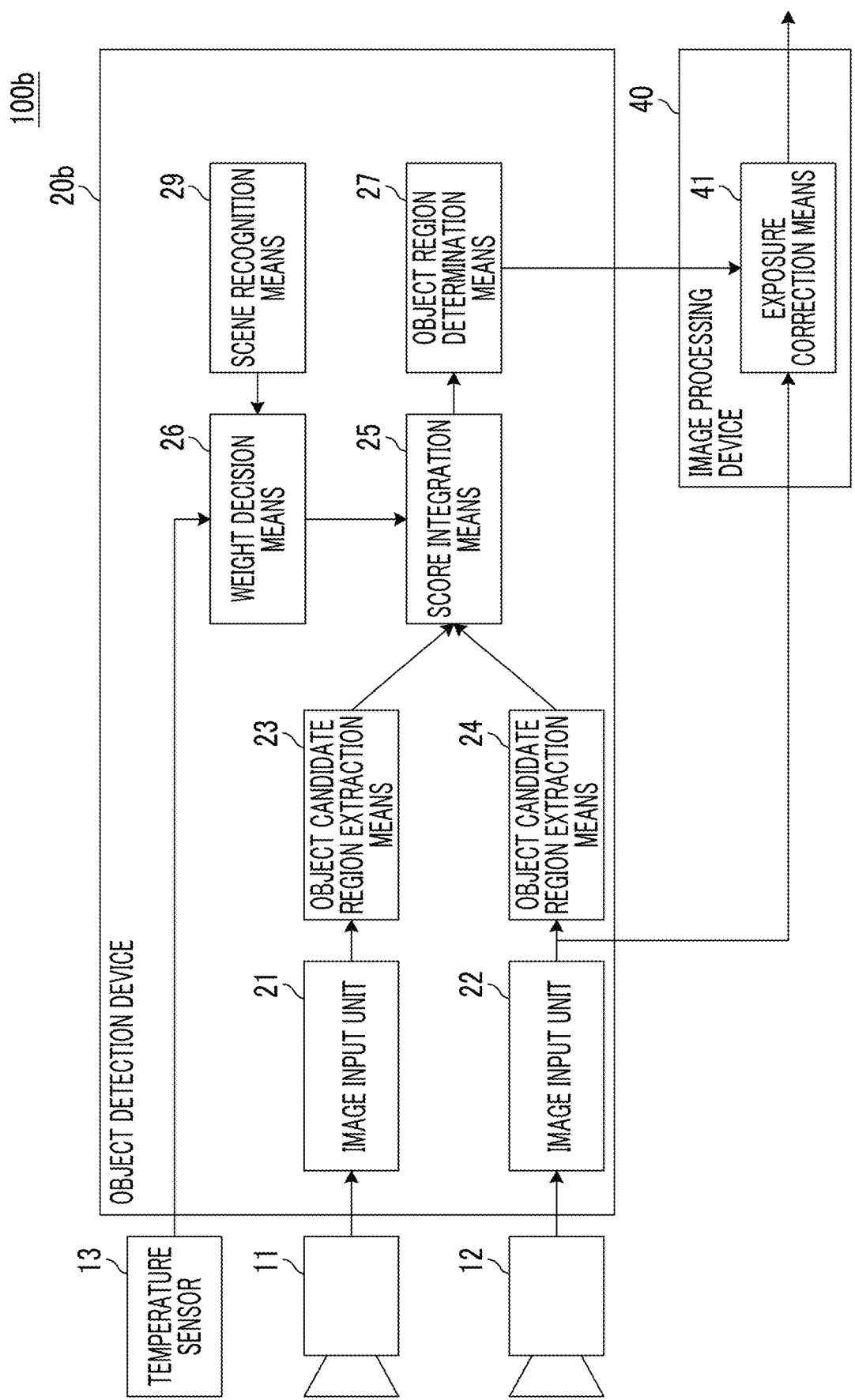
FIG. 10 is a block diagram illustrating an imaging system according to a third embodiment of the present invention.

Next, a third embodiment of the present invention will be described. FIG. 10 is a block diagram illustrating an imaging system according to the third embodiment of the present invention. An imaging system 100b of the present embodiment is different from the imaging system 100 according to the first embodiment illustrated in FIG. 1, in a point that the imaging system 100b includes scene recognition means 29 in an object detection device 20b. Other configurations are the same as those of the first embodiment.

The scene recognition means 29 (scene recognition unit) recognizes an imaging scene on the basis of the captured visible light image. The imaging scene includes at least one of a landscape, a sea, a snow, or a mountain. As a scene interpretation method in the scene recognition means 29, for example, a method disclosed in JP2005-310123A, or a method disclosed JP2005-122720A may be used. In the present embodiment, the weight decision means 26 adjusts at least one of the first weight or the second weight on the basis of a result of the scene recognition of the scene recognition means 29.

For example, in a case in which the scene recognition means 29 determines that a scene of the visible light image captured by the visible light imaging device 12 is a scene of the landscape, the mountain, or the like, it is expected that a mountain, a tree, or the like is given as a subject in the visible light image. Referring to Table 1, although an infrared light emissivity of the tree is less than that of the skin and the temperature of the tree is equal to that of the skin, there is a difference between the amount of the infrared light energy emitted from the tree and the amount of the infrared light energy emitted from the skin. Therefore, although the tree is present in the background of the person, it is considered that the person is not equalized to the background in the infrared light image.

In addition, in a case in which the imaging scene is the landscape, the sea, and the mountain, it is considered that a sky or the like is the background in many cases. Since the amount of the infrared light energy provided from the sky is low, even though the sky is present in the background of the person, it is considered that the person is not equalized to the background in the infrared light image. In addition, even in a case in which the air temperature is high, since the temperature of the sea (seawater) and the snow is low, a case in which the scene recognized by the scene recognition means 29 is the sea or the snow is also considered that the person is not equalized to the background in the infrared light image.

In a case in which the scene recognition means 29 recognizes that the imaging scene is the landscape, the sea, the snow, or the mountain, the weight decision means 26 increases the first weight for the first evaluation value so as to be greater than the weight decided on the basis of the environment temperature. Alternatively or additionally, the weight decision means 26 may reduce the second weight for the second evaluation value so as to be less than the weight decided on the basis of the environment temperature.

In the present embodiment, the scene recognition means 29 recognizes the imaging scene by the visible light imaging device 12, and the weight decision means 26 adjusts the weight according to the result of the scene recognition. It is lowly possible that the object is equalized to the background in the infrared light image, in a specific imaging scene. In a case in which the scene is recognized as such an imaging scene, the weight decision means 26 comparatively increases the first weight for the first evaluation value. Therefore, it is possible to increase a specific gravity of the first evaluation value in the integration evaluation value and it is possible to stably perform the determination of the object by using the information on the infrared light image. Other effects are the same as those of the first embodiment.

Figure 11:
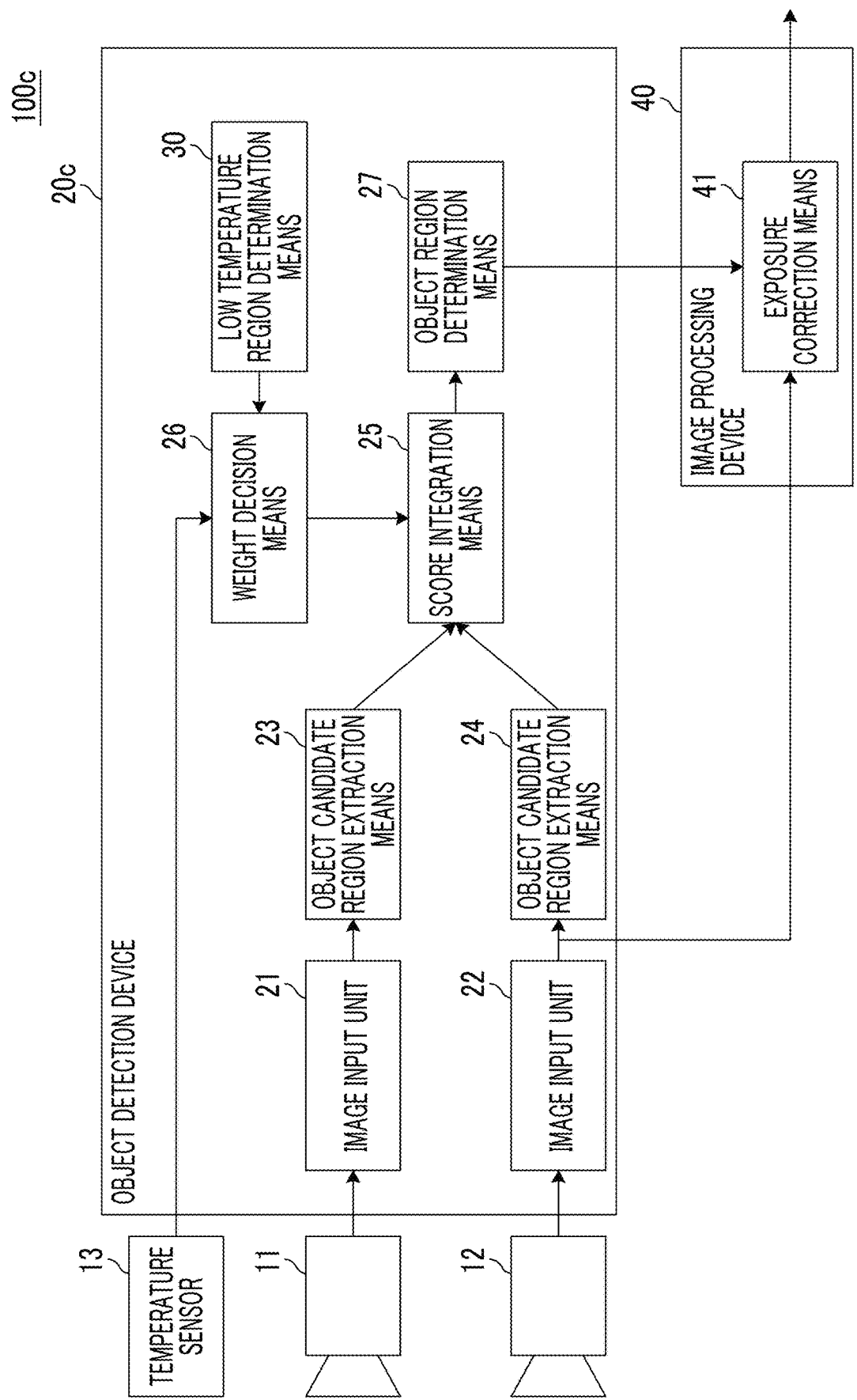
FIG. 11 is a block diagram illustrating an imaging system according to a fourth embodiment of the present invention.

Next, a fourth embodiment of the present invention is described. FIG. 11 is a block diagram illustrating an imaging system according to the fourth embodiment of the present invention. An imaging system 100c of the present embodiment is different from the imaging system 100 according to the first embodiment illustrated in FIG. 1, in a point that the imaging system 100c includes a low temperature region determination means 30 in an object detection device 20c. Other configurations are the same as those of the first embodiment.

The low temperature region determination means (low temperature region determination unit) 30 determines that how many low temperature regions which are included in the infrared light image are present. The low temperature region determination means 30 obtains the area of a region where the temperature is equal to or less than a first threshold value (temperature threshold value) in the infrared light image, and determines whether or not the area thereof is equal to or greater than a second threshold value (area threshold value). For example, the first threshold value is decided on the basis of the average human body temperature. The weight decision means 26 adjusts at least one of the first weight for the first evaluation value or the second weight for the second evaluation value on the basis of a determination result of the low temperature region determination means 30.

In a case in which many low temperature regions are included in the infrared light image, for example, it is considered that a sky, a sea, or the like is the background. In this case, since it is lowly possible that the person is equalized to the background in the infrared light image, it is preferable to increase the first weight for the first evaluation value. In a case in which the low temperature region determination means 30 determines that many low temperature regions are included in the infrared light image, the weight decision means 26 increases the first weight so as to be greater than the first weight decided on the basis of the environment temperature. Alternatively or additionally, the weight decision means 26 may reduce the second weight so as to be less than the weight decided on the basis of the environment temperature.

In the present embodiment, the low temperature region determination means 30 determines whether or not many low temperature regions are included in the infrared light image. In a case in which many low temperature regions are included in the infrared light image, it is considered that it is lowly possible that the object is equalized to the background in the infrared light image. In this case, the weight decision means 26 comparatively increases the first weight for the first evaluation value. Therefore, it is possible to increase a specific gravity of the first evaluation value in the integration evaluation value and it is possible to stably perform the determination of the object by using the information on the infrared light image. Other effects are the same as those of the first embodiment.

Figure 12:
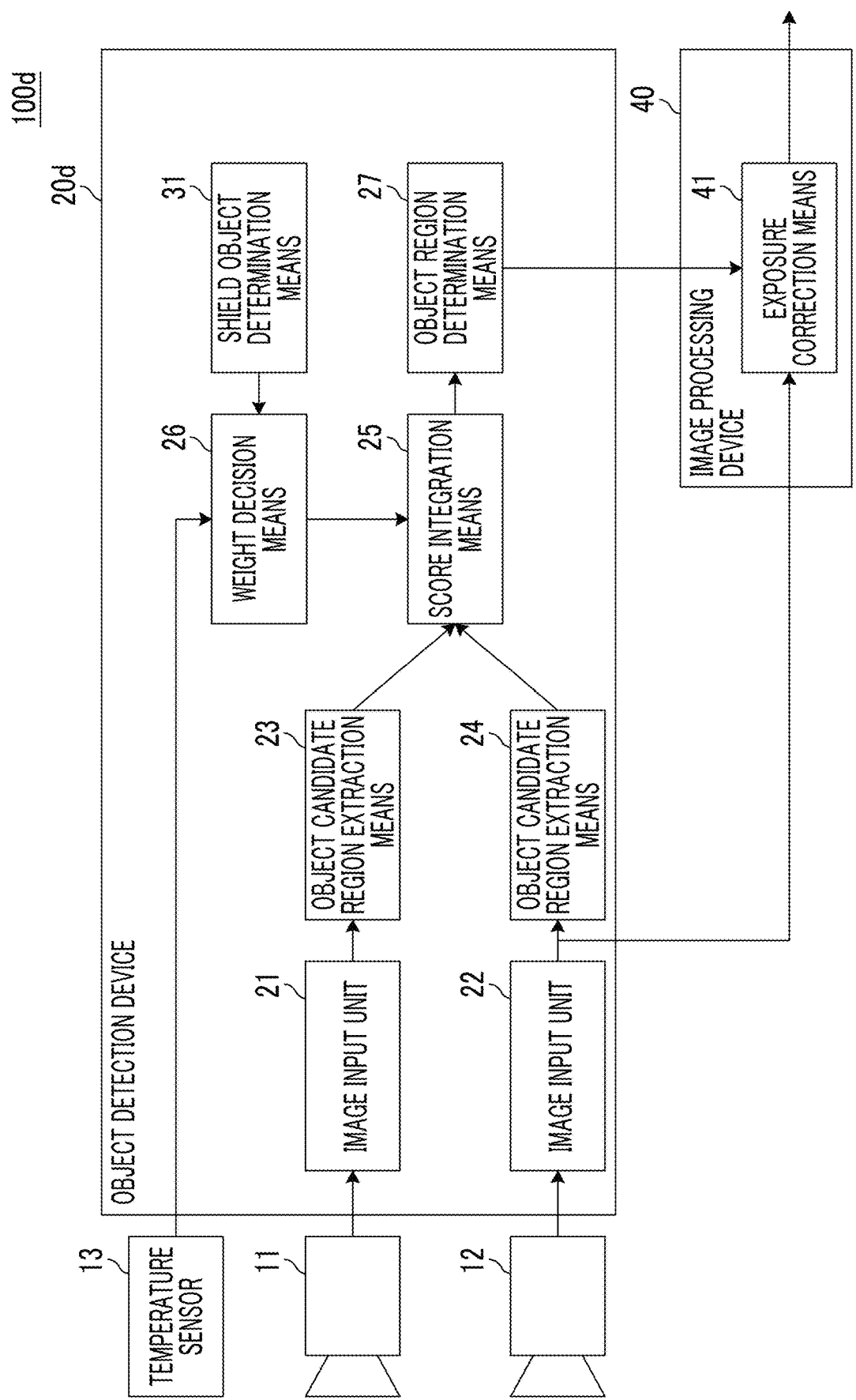
FIG. 12 is a block diagram illustrating an imaging system according to a fifth embodiment of the present invention.

Next, a fifth embodiment of the present invention is described. FIG. 12 is a block diagram illustrating an imaging system according to the fifth embodiment of the present invention. An imaging system 100d of the present embodiment is different from the imaging system 100 according to the first embodiment illustrated in FIG. 1, in a point that the imaging system 100d includes a shield object determination means 31 in an object detection device 20d. Other configurations are the same as those of the first embodiment.

The shield object determination means (shield object determination unit) 31 determines whether or not a shield object which shields infrared light is present between the infrared light imaging device 11 and a subject, on the basis of the visible light image and the infrared light image. The shield object determination means 31 compares an outline shape of the subject in the visible light image with an outline shape of the subject in the infrared light image, and in a case in which both are identical to each other, determines that the shield object is present. The shield object determination means 31 may use a camera which stereo-images the imaging region, and may determine whether or not the shield object such as a glass is present on the basis of an image which is captured by the camera.

The weight decision means 26 adjusts at least one of the first weight for the first evaluation value or the second weight for the second evaluation value on the basis of a determination result of the shield object determination means 31. In a case in which the shield object determination means determines that the shield object is present between the infrared light imaging device 11 and the subject, the weight decision means 26 reduces the first weight for the first evaluation value so as to be less than the first weight decided on the basis of the environment temperature. Alternatively or additionally, the weight decision means 26 may increase the second weight so as to be greater than the weight decided on the basis of the environment temperature.

In the present embodiment, the shield object determination means 31 determines whether or not the shield object which shields the infrared light is present between the infrared light imaging device 11 and the subject. In a case in which the shield object is present, it is possible that the object is given to the visible light image and the object is not given to the infrared light image. In such a case, it is possible to reduce a specific gravity of the first evaluation value in the integration evaluation value, by comparatively reducing the first weight for the first evaluation value. In this case, it is possible to stably perform the determination of the object by using the information on the visible light image. Other effects are the same as those of the first embodiment.

Figure 13:
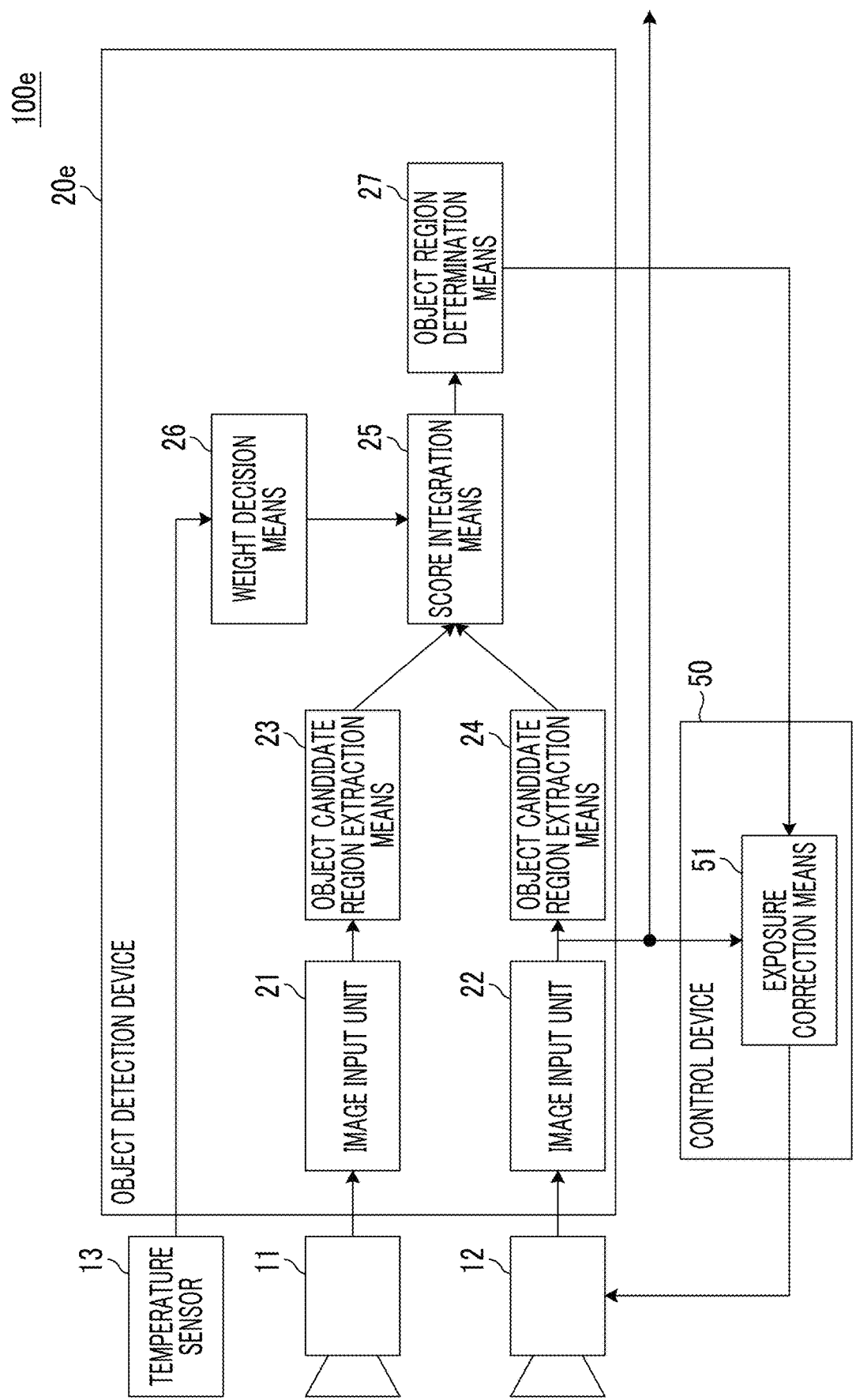
FIG. 13 is a block diagram illustrating an imaging system according to a sixth embodiment of the present invention.

Next, a sixth embodiment of the present invention is described. FIG. 13 is a block diagram illustrating an imaging system according to the sixth embodiment of the present invention. An imaging system 100e of the present embodiment is different from the first embodiment, in a point that the imaging system 100e includes a control device 50 instead of the image processing device 40 illustrated in FIG. 1. The control device 50 receives a determination result of an object region by an object detection device 20e, and control the visible light imaging device 12. The visible light imaging device 12 includes an exposure time control unit (not shown). Other configurations are the same as those of the first embodiment.

The control device 50 includes exposure correction means 51. The exposure correction means (exposure correction unit) 51 carries out an exposure correction process of the visible light image. In the present embodiment, the exposure correction includes a process of adjusting the exposure time in the visible light imaging device. The exposure correction means 51 decides the exposure time in next imaging by the visible light imaging device 12 on the basis of the pixel signal value within the object region in the visible light image. For example, in a case in which the person region tends to an overexposure in the visible light image, the exposure correction means 51 shortens the exposure time compared to the exposure time at the time of the previous imaging in the visible light imaging device 12. Therefore, by changing an imaging condition, it is possible to obtain the visible light image generated by capturing an object with an appropriate exposure.

In addition, in each of the embodiments described above, an example in which the weight decision means 26 decides the weight on the basis of the environment temperature is described, but the present invention is not limited thereto. The weight decision means 26 may decide the weight on the basis of the amount of the infrared light energy emitted from the subject, instead of the environment temperature. The amount of the infrared light energy emitted from the subject corresponds to the signal intensity of an infrared light detection signal of a portion where the subject is present, and the pixel value of the infrared light image. In a case in which the amount of the infrared light energy emitted from the object is set as Et, and E1 and E2 are set as positive real numbers, the weight decision means 26 may set the first weight for the first evaluation value so as to be less than the second weight for the second evaluation value, in a case in which the first object candidate region extracted from the infrared light image does not include a pixel having a pixel value corresponding to the amount of the infrared light energy of a range which is equal to or greater than Et−E1 and is equal to or less than Et+E2. For example, in a case in which the person is considered as the object, the first weight may be reduced, in a case in which it is assumed that the amount of the infrared light energy emitted from the person is 0.0509 W/cm$^2$, and a pixel having the amount of the infrared light energy which is equal to or greater than 0.0509−E1 and is equal to or less than 0.0509+E2 is not present. The E1 and E2 may be equal to each other, or may be different from each other.

Figure 14:
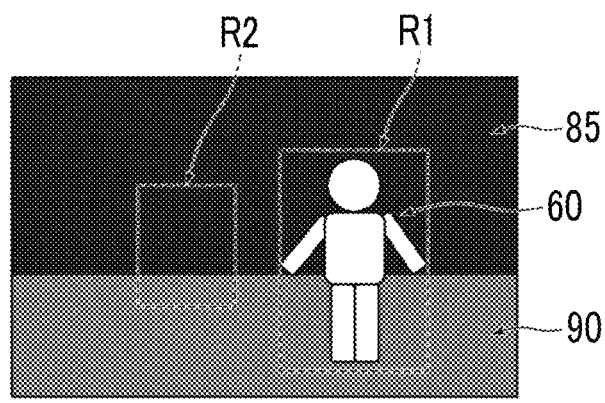
FIG. 14 is a diagram illustrating an example of the infrared light image.

The above will be described by using a specific example. FIG. 14 illustrates an example of the infrared light image. In the infrared light image, the person 60 is imaged as the subject. The amount of the infrared light energy emitted from the person 60 is relatively low. In other words, a region of a sky 85 and a region of a sea 90 of a relatively low temperature are the background. In a case in which the amount of the infrared light energy emitted from the person 60 is converted into the pixel value (signal intensity of infrared light detection signal), it is assumed that the value is 200. Similarly, it is assumed that a value obtained by converting an amount of infrared light energy emitted from the sky 85 into a pixel value is 10, and a value obtained by converting an amount of infrared light energy emitted from the sea 90 into a pixel value is 50. In other words, in the infrared light image, it is assumed that the pixel value of a portion region corresponding to the person 60 is 200, the pixel value of a portion region corresponding to the sky 85 is 10, and the pixel value of a portion region corresponding to the sea 90 is 50.

As the first object candidate region (person candidate region) extracted from the infrared light image, two regions of a region R1 and a region R2 illustrated in FIG. 14 are considered. The region R1 includes a region where the person 60 is present. It is assumed that the maximum value of the pixel value within the region R1 is 200, the minimum value of the pixel value is 10, and an average value of the pixel value within the region is 100. On the other hand, the region R2 is a region which does not include the person 60. It is assumed that the maximum value of the pixel value within the region R2 is 50, the minimum value of the pixel value is 10, and an average value of the pixel value within the region is 25.

The weight decision means 26 examines whether or not, for example, a pixel having a pixel value included in a range of ±50 centered on the pixel value 200 corresponding to the amount of the infrared light energy emitted from the person 60 is present, in the first person candidate region extracted from the infrared light image. In a case in which such a pixel is not present, or the number of such pixels is less than a threshold value related to the number of the pixels, the weight decision means 26 reduces the first weight for the first person candidate region extracted from the infrared light image, so as to be less than the second weight for the second person candidate region extracted from the visible light image. In other words, in a case in which the first person candidate region does not include pixels having a pixel value equal to or greater than 150(200−50) and equal to or less than 250(200+50), or the number of such pixels is low, the weight decision means 26 reduces the first weight so as to be less than the second weight. In a case in which the first person candidate region includes the pixels having the pixel value equal to or greater than 150(200−50) and equal to or less than 250(200+50) by a value equal to or greater than a threshold value related to the number of the pixels, the weight decision means 26 may increase the first weight so as to be greater than the second weight.

In FIG. 14, the maximum value of the pixel value of the region R1 is 200, and in the region R1, a relatively large number of pixels having the pixel value equal to or greater than 150 and equal to or less than 250 are included. In this case, the weight decision means 26 increases the first weight so as to be greater than the second weight with respect to the region R1. On the other hand, in the region R2, the maximum value of the pixel value is 50, and in the region R2, the pixel having the pixel value equal to or greater than 150 and equal to or less than 250 is not included. In this case, the weight decision means 26 reduces the first weight so as to be less than the second weight with respect to the region R2. By such a control of the weight, the weight for the first evaluation value in the integration evaluation value is increased with respect to a region including a portion where an emission source of the infrared light energy is considered as the person, and thus it is possible to perform the determination of the person region where the result of the person candidate region extraction is emphasized in the infrared light image. Inversely, the weight for the first evaluation value in the integration evaluation value is reduced with respect to a region which does not include the portion where the emission source of the infrared light energy is considered as the person, and thus it possible to perform the determination of the object region where the result of the object candidate region extraction is emphasized in the visible light image.

Here, in the weight decision means 26, an average value of the pixel value in the first person candidate region is compared with the pixel value corresponding to the amount of the infrared light energy emitted from the person, and in a case in which the average value is not included in the range of ±50 centered on the pixel value 200, it is considered that the first weight is adjusted so as to be less than the second weight. In this case, like the region R1 illustrated in FIG. 14, in a case in which even though a region is the region where the person 60 is present, since the pixel value of the low temperature background region is low, the average value of the pixel value in the region is reduced, the first weight is set to be less than the second weight. With respect to this, as described above, in a case in which the pixel having the pixel value equal to or greater than 150 and equal to or less than 250 is not included in the first person candidate region, it is possible to suppress setting the first weight low with respect to the first person candidate region where it is highly possible that the person is included therein, in a case in which the first weight is set to be less than the second weight.

In the above description, the weight decision means 26 decides the weight on the basis of the environment temperature and the amount of the infrared light energy emitted from the subject, however, the present invention is not limited thereto. The weight decision means 26 may decide the weight on the basis of both the environment temperature and the amount of the infrared light energy emitted from the subject. In this case, the weight decision means 26 may set the first weight for the first evaluation value so as to be less than the second weight for the second evaluation value, in a case in which the environment temperature is in the temperature range which is equal to or higher than T1 and is equal to or lower than T2, and the first object candidate region extracted from the infrared light image does not include the pixel having the pixel value corresponding to the amount of the infrared light energy of the range which is equal to or greater than Et−E1 and is equal to or less than Et+E2.

Instead of deciding the weight according to the amount of the infrared light energy, a specific region in the infrared light image may be excluded from a process target in the first object candidate region extraction means 23 according to the amount of the infrared light energy. Specifically, the first object candidate region extraction means 23 may extract the object candidate region (person candidate region) by excluding the region having the amount of the infrared light energy equal to or less than 0.0509−E1 or equal to or greater than 0.0509+E2 from the infrared light image. In this case, it is possible to prevent incorrectly extracting the tree, which is likely to be misrecognized as the person in a shape, as the person candidate region, by appropriately setting the value of E1.

Each of the embodiments described above may be randomly combined with each other. For example, it is possible to randomly combine the configurations in each embodiment of the second to fifth embodiments with each other. That is, the object detection device may include two or more means selected from a group of the backlight determination means 28, the scene recognition means 29, the low temperature region determination means 30, and the shield object determination means 31. In addition, the second to fifth embodiments may be combined with the sixth embodiment, in the configurations of each embodiment of the second to fifth embodiments, the exposure correction of the visible light image may be performed by controlling the exposure time of the visible light imaging device 12. The object detection device may perform the exposure correction of the visible light image by controlling the exposure time of the visible light imaging device 12 similarly to the sixth embodiment, even in a case in which the object detection device includes two or more means selected from the group of the backlight determination means 28, the scene recognition means 29, the low temperature region determination means 30, and the shield object determination means 31.

The present invention has been described based on preferred embodiments thereof. However, the imaging system, the object detection device, and the method of operating the same of the present invention is not limited to those of the above-described embodiments, and various modifications and changes made to the above-described embodiments are also within the scope of the present invention.

EXPLANATION OF REFERENCES

100: imaging system
11: infrared light imaging device (first imaging device)
12: visible light imaging device (second imaging device)
20: object detection device
21, 22: image input unit
23, 24: object candidate region extraction means
25: score integration means
26: weight decision means
27: object region determination means
28: backlight determination means
29: scene recognition means
30: low temperature region determination means
31: shield object determination means
40: image processing device
41: exposure correction means
50: control device
51: exposure correction means
60: person
70: tree
80: house
85: sky
90: sea

What is claimed is:

1. An imaging system comprising:
a first imaging device that images infrared light;
a second imaging device that images visible light;
a first object candidate region extraction unit that extracts a first object candidate region where an object is expected to be present from an infrared light image captured by the first imaging device;
a second object candidate region extraction unit that extracts a second object candidate region where the object is expected to be present from a visible light image captured by the second imaging device;
a score integration unit that calculates an integration evaluation value by performing a weighted addition of a first evaluation value indicating a degree of likelihood of the object in the first object candidate region and a second evaluation value indicating the degree of likelihood of the object in the second object candidate region;
a weight decision unit that decides a first weight for the first evaluation value and a second weight for the second evaluation value in the weighted addition, on the basis of at least one of a surrounding environmental temperature or an amount of infrared light energy emitted from an imaging region;
an object region determination unit that determines an object region where the object is present on the basis of the integration evaluation value; and
an exposure correction unit that decides an amount of an exposure correction on the basis of a pixel signal value within the object region in the visible light image and carries out the exposure correction of the visible light image.

2. The imaging system according to claim 1,
wherein, in a case in which the object is a person, the weight decision unit decides the weight on the basis of the environment temperature, T1 is assumed as a temperature lower than an average human body temperature, and T2 is assumed as a temperature higher than the average human body temperature, the first weight is set to be less than the second weight, in a case in which the environment temperature is in a temperature range equal to or higher than T1 and is equal to or lower than T2.

3. The imaging system according to claim 2,
wherein, in a temperature range in which the environment temperature is equal to or higher than a temperature lower than T1 by 5° C. and is equal to or lower than T1, the weight decision unit gradually increases the first weight from the first weight of a case in which the environment temperature is T1 as the environment temperature is lowered from T1, and/or in a temperature range in which the environment temperature is equal to or higher than T2 and is equal to or lower than a temperature higher than T2 by 5° C., the weight decision unit gradually increases the first weight from the first weight of a case in which the environment temperature is T2 as the environment temperature is increased from T2.

4. The imaging system according to claim 1, wherein, in a case in which the weight decision unit decides the weight on the basis of the amount of the infrared light energy, the amount of the infrared light energy emitted from the object is set as Et, and E1 and E2 are set as positive real numbers, the first weight is set to be less than the second weight, in a case in which the first object candidate region in the infrared light image does not include a pixel having a pixel value corresponding to the amount of the infrared light energy which is equal to or greater than Et−E1 and is equal to or less than Et+E2.

5. The imaging system according to claim 1, wherein, in a case in which the object is a person, the weight decision unit decides the weight on the basis of the environment temperature and the amount of the infrared light energy, T1 is assumed as a temperature lower than an average human body temperature, T2 is assumed as a temperature higher than the average human body temperature, the amount of the infrared light energy emitted from the object is set as Et, and E1 and E2 are set as positive real numbers, the first weight is set to be less than the second weight, in a case in which the environment temperature is in a temperature range which is equal to or higher than T1 and is equal to or lower than T2, and the first object candidate region in the infrared light image does not include a pixel having a pixel value corresponding to the amount of the infrared light energy which is equal to or greater than Et−E1 and is equal to or less than Et+E2.

6. The imaging system according to claim 1, further comprising:
a backlight determination unit that determines whether or not a backlight state is present in the visible light image on the basis of a luminance histogram of the visible light image,
wherein the weight decision unit adjusts at least one of the first weight or the second weight on the basis of a determination result of the backlight determination unit.

7. The imaging system according to claim 6, wherein, in a case in which the backlight determination unit determines that a state is the backlight state, the weight decision unit increases the first weight so as to be greater than a first weight decided on the basis of at least one of the environment temperature or the amount of the infrared light energy, and/or reduces the second weight so as to be less than a second weight decided on the basis of the at least one of the environment temperature or the amount of the infrared light energy.

8. The imaging system according to claim 1, further comprising:
a scene recognition unit that recognizes an imaging scene including at least one of a landscape, a sea, a snow, or a mountain, on the basis of the visible light image,
wherein the weight decision unit adjusts at least one of the first weight or the second weight on the basis of a result of scene recognition of the scene recognition unit.

9. The imaging system according to claim 2, further comprising:
a scene recognition unit that recognizes an imaging scene including at least one of a landscape, a sea, a snow, or a mountain, on the basis of the visible light image,
wherein the weight decision unit adjusts at least one of the first weight or the second weight on the basis of a result of scene recognition of the scene recognition unit.

10. The imaging system according to claim 3, further comprising:
a scene recognition unit that recognizes an imaging scene including at least one of a landscape, a sea, a snow, or a mountain, on the basis of the visible light image,
wherein the weight decision unit adjusts at least one of the first weight or the second weight on the basis of a result of scene recognition of the scene recognition unit.

11. The imaging system according to claim 4, further comprising:
a scene recognition unit that recognizes an imaging scene including at least one of a landscape, a sea, a snow, or a mountain, on the basis of the visible light image,
wherein the weight decision unit adjusts at least one of the first weight or the second weight on the basis of a result of scene recognition of the scene recognition unit.

12. The imaging system according to claim 8, wherein, in a case in which the imaging scene is recognized as the landscape, the sea, the snow, or the mountain by the scene recognition unit, the weight decision unit increases the first weight so as to be greater than a first weight decided on the basis of at least one of the environment temperature or the amount of the infrared light energy, and/or reduces the second weight so as to be less than a second weight decided on the basis of the at least one of the environment temperature or the amount of the infrared light energy.

13. The imaging system according to claim 1, further comprising:
a low temperature region determination unit that determines whether or not an area of a region where a temperature is equal to or less than a first threshold value is included in the infrared light image by a value equal to or greater than a second threshold value,
wherein the weight decision unit adjusts at least one of the first weight or the second weight on the basis of a determination result of the low temperature region determination unit.

14. The imaging system according to claim 13, wherein, in a case in which the low temperature region determination unit determines that the area of the region where the temperature is equal to or less than the first threshold value is included in the infrared light image by a value equal to or greater than the second threshold value, the weight decision unit increases the first weight so as to be greater than a first weight decided on the basis of at least one of the environment temperature or the amount of the infrared light energy, and/or reduces the second weight so as to be less than a second weight decided on the basis of the at least one of the environment temperature or the amount of the infrared light energy.

15. The imaging system according to claim 1, further comprising:
a shield object determination unit that determines whether or not a shield object which shields the infrared light is present between the first imaging device and the object on the basis of the visible light image and the infrared light image, wherein the weight decision unit adjusts at least one of the first weight or the second weight on the basis of a determination result of the shield object determination unit.

16. The imaging system according to claim 15,
wherein, in a case in which the shield object determination unit determines that the shield object is present between the first imaging device and the object, the weight decision unit reduces the first weight so as to be less than a first weight decided on the basis of at least one of the environment temperature or the amount of the infrared light energy, and/or increases the second weight so as to be greater than a second weight decided on the basis of the at least one of the environment temperature or the amount of the infrared light energy.

17. The imaging system according to claim 1,
wherein the exposure correction includes a process of adjusting a brightness of the visible light image on the basis of a histogram of a pixel signal value within the object region in the visible light image.

18. The imaging system according to claim 1,
wherein the exposure correction includes a process of adjusting an exposure time in the second imaging device.

19. An object detection device comprising:
a first object candidate region extraction unit that extracts a first object candidate region where an object is expected to be present from an infrared light image captured by a first imaging device which images infrared light;
a second object candidate region extraction unit that extracts a second object candidate region where the object is expected to be present from a visible light image captured by a second imaging device which images visible light;
a score integration unit that calculates an integration evaluation value by performing a weighted addition of a first evaluation value indicating a degree of likelihood of the object in the first object candidate region and a second evaluation value indicating the degree of likelihood of the object in the second object candidate region;
a weight decision unit that decides a first weight for the first evaluation value and a second weight for the second evaluation value in the weighted addition, on the basis of at least one of a surrounding environmental temperature or an amount of infrared light energy emitted from an imaging region; and
an object region determination unit that determines an object region where the object is present on the basis of the integration evaluation value.

20. A method of operating an object detection device, the method comprising:
a step of extracting a first object candidate region where an object is expected to be present from an infrared light image captured by a first imaging device which images infrared light;
a step of extracting a second object candidate region where the object is expected to be present from a visible light image captured by a second imaging device which images visible light;
a step of deciding a first weight for a first evaluation value indicating a degree of likelihood of the object in the first object candidate region, and a second weight for a second evaluation value indicating the degree of likelihood of the object in the second object candidate region, on the basis of at least one of a surrounding environmental temperature or an amount of infrared light energy emitted from an imaging region;
a step of calculating an integration evaluation value by performing a weighted addition of the first evaluation value and the second evaluation value by using the first weight and the second weight; and
a step of determining an object region where the object is present on the basis of the integration evaluation value.

* * * * *